US006486958B1

(12) United States Patent
Szafraniec et al.

(10) Patent No.: US 6,486,958 B1
(45) Date of Patent: Nov. 26, 2002

(54) METHOD AND SYSTEM FOR OPTICAL SPECTRUM ANALYSIS WITH MATCHED FILTER DETECTION

(75) Inventors: Bogdan Szafraniec, Sunnyvale, CA (US); Douglas M. Baney, Los Alto, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 22 days.

(21) Appl. No.: 09/841,393

(22) Filed: Apr. 24, 2001

(51) Int. Cl.[7] .................................................. G01B 9/02
(52) U.S. Cl. ................... 356/451; 250/227.23; 359/191
(58) Field of Search ................................ 356/451, 458, 356/460; 250/226, 227.18, 227.23; 359/123, 124, 191–195

(56) References Cited

U.S. PATENT DOCUMENTS 4,648,134 A * 3/1987 Stewart ...................... 359/191
4,856,899 A 8/1989 Iwaoka et al. .............. 356/346
5,510,927 A 4/1996 Noe ........................... 359/191
6,160,626 A 12/2000 Debeau et al. .............. 356/451

* cited by examiner

*Primary Examiner*—Que T. Le

(57) ABSTRACT

Heterodyne-based optical spectrum analysis involves filtering a heterodyne beat signal with at least one matched filter in order to improve the signal-to-noise ratio and the spectral resolution of the heterodyne-based optical spectrum analysis. In an embodiment, an input signal is combined with a swept local oscillator signal in an optical coupler. The combined optical signal is output to a receiver and a heterodyne beat signal is detected. The heterodyne beat signal is filtered by a matched filter unit and the filtered heterodyne beat signal is utilized to generate an output signal that is indicative of an optical parameter of the input signal. By utilizing the quadratic phase behavior of the heterodyne beat signal in signal processing, the resolution of a heterodyne-based OSA can be substantially improved over known heterodyne-based OSAs.

32 Claims, 7 Drawing Sheets

METHOD AND SYSTEM FOR OPTICAL SPECTRUM ANALYSIS WITH MATCHED FILTER DETECTION

FIELD OF THE INVENTION

The invention relates generally to the field of optical measurements and measuring systems, and more particularly to a method and system for optical spectrum analysis that utilizes optical heterodyne detection.

BACKGROUND OF THE INVENTION

Dense wavelength division multiplexing (DWDM) requires optical spectrum analyzers (OSAs) that have higher spectral resolution than is typically available with current OSAs. For example, grating based OSAs and autocorrelation based OSAs encounter mechanical constraints, such as constraints on beam size and the scanning of optical path lengths, which limit the degree of resolution that can be obtained. As an alternative to grating based and autocorrelation based OSAs, optical heterodyne detection systems can be utilized to monitor DWDM systems.

Optical heterodyne detection systems are utilized for optical spectrum analysis of an input optical signal. FIG. 1 is a depiction of a prior art heterodyne-based detection system that includes an optical coupler 110 that combines an input signal 102 from an input fiber 104 with a swept local oscillator signal 106 from a local oscillator source 105 via local oscillator fiber 108. The combined optical signal travels on an output fiber 118 and is detected by a heterodyne receiver 112. The heterodyne receiver converts optical radiation from the combined optical signal into an electrical signal. Square law detection results in mixing of the two combined optical signals and produces a heterodyne beat signal at a frequency that is equal to the frequency difference between the combined optical signals. The heterodyne beat signal is processed by a signal processor 116 to determine a characteristic of the input signal, such as frequency, wavelength, or amplitude. The resolution of heterodyne-base OSAs is directly related to the bandwidth of the heterodyne receiver. Specifically, the wider the bandwidth of the heterodyne receiver, the better the amplitude resolution of the OSA and the narrower the bandwidth of the heterodyne receiver, the better the frequency resolution of the OSA. Furthermore, the amplitude accuracy of the heterodyne receiver depends on the sweep rate of the local oscillator signal. For example, to achieve an industry acceptable amplitude accuracy of approximately 0.1 dB given a local oscillator sweep rate in the tens of nanometers per second, the required heterodyne receiver bandwidth is in the tens of Megahertz. The bandwidth of the receiver defines the resolution of the heterodyne-based OSA when using a signal processing technique such as envelope detection. In envelope detection, the envelope can be approximated by an average, which is found by moving a window averaging filter across the detected heterodyne beat signal. FIG. 2 depicts envelope detection of a quadratic phase signal 120, such as a heterodyne beat signal that is observed from the mixing of highly coherent optical signals. The detected heterodyne beat signal is squared 122 and then filtered by window averaging to produce the detected envelope 126. As shown in FIG. 2, the resolution of the detected envelope is determined by the bandwidth of the heterodyne receiver. Although envelope detection works well in heterodyne-based OSAs, as the density of DWDM channels increases, there is a need for OSAs with greater resolution.

SUMMARY OF THE INVENTION

A method and system for heterodyne-based optical spectrum analysis involves filtering a heterodyne beat signal with at least one matched filter in order to improve the signal-to-noise ratio and the spectral resolution of the heterodyne-based optical spectrum analysis. In an embodiment, an input signal is combined with a swept local oscillator signal in an optical coupler. The combined optical signal is output to a receiver and a heterodyne beat signal is generated. The heterodyne beat signal is filtered by a matched filter unit and the filtered heterodyne beat signal is utilized to generate an output signal that is indicative of an optical parameter of the input signal. For highly coherent lasers the heterodyne beat signal exhibits a quadratic phase behavior. By utilizing the quadratic phase behavior of the heterodyne beat signal in signal processing, the resolution of a heterodyne-based OSA can be substantially improved over known heterodyne-based OSAs.

In an embodiment, the matched filter unit includes two matched filters that are orthogonal. The two orthogonal matched filters enable the output of the OSA to be independent of the phase difference between the input signal and the swept local oscillator signal. Specifically, using orthogonal matched filters allows for the spectral characterization of highly coherent, narrow-linewidth lasers whose spectral features are narrower than the bandwidth of the heterodyne receiver.

A method for optical spectrum analysis that utilizes optical heterodyne detection involves providing an input signal, providing a swept local oscillator signal, combining the input signal with the swept local oscillator signal to create a combined optical signal, detecting the combined optical signal to generate a heterodyne beat signal, filtering the heterodyne beat signal with a matched filter, and generating an output signal from the filtered heterodyne beat signal that is indicative of an optical parameter of the input signal.

In an embodiment, the heterodyne beat signal is split into a first heterodyne beat signal and a second heterodyne beat signal. The first heterodyne beat signal is filtered with a first matched filter to produce a filtered first heterodyne beat signal and the second heterodyne beat signal is filtered with a second matched filter to produce a filtered second heterodyne beat signal. The output signal is generated from the filtered first and second heterodyne beat signal. In a further embodiment, the first and second matched filters are orthogonal.

In an embodiment, the filtering is performed in the time domain and in another embodiment, the filtering is performed in the frequency domain.

A system for optical spectrum analysis includes an optical coupler, a heterodyne receiver, and a signal processor. The optical coupler has a first input, a second input, and an output. The first input being optically connected to receive an input signal, the second input being optically connected to receive a swept local oscillator signal, and the output being optically connected to output a combined optical signal that includes the input signal and the swept local oscillator signal. The heterodyne receiver has an input for receiving the combined optical signal from the optical coupler and an output for outputting a heterodyne beat signal that is representative of the combined optical signal. The signal processor receives the heterodyne beat signal from the optical receiver and generates an output signal that is indicative of an optical parameter of the input signal. The signal processor also includes a matched filter unit for filtering the heterodyne beat signal before the output signal is generated.

In an embodiment, the matched filter unit includes a splitter for splitting the heterodyne beat signal into a first heterodyne beat signal and a second heterodyne beat signal, a first matched filter configured to filter the first heterodyne beat signal and to output a filtered first heterodyne beat signal, and a second matched filter configured to filter the second heterodyne beat signal and to output a filtered second heterodyne beat signal. In a further embodiment, the first and second matched filters are orthogonal. In a further embodiment, the first and second matched filters are configured to filter in the time domain. In a further embodiment, the first and second matched filters are configured to filter in the frequency domain.

Other aspects and advantages of the present invention will become apparent from the following detailed description, taken in conjunction with the accompanying drawings, illustrating by way of example the principles of the invention.

DETAILED DESCRIPTION OF THE INVENTION

A method and system for heterodyne-based optical spectrum analysis involves filtering a heterodyne beat signal with at least one matched filter in order to improve the signal-to-noise ratio and the spectral resolution of the heterodyne-based optical spectrum analysis. In an embodiment, an input signal is combined with a swept local oscillator signal in an optical coupler. The combined optical signal is output to a receiver and a heterodyne beat signal is detected. The heterodyne beat signal is filtered by a matched filter unit and the filtered heterodyne beat signal is utilized to generate an output signal that is indicative of an optical parameter of the input signal. As described in more detail below, the matched filter matches the signal being detected. In an embodiment, the matched filter unit includes two matched filters that are orthogonal. The two orthogonal matched filters enable the output of the OSA to be independent of the phase difference, $\psi$, between the input signal and the swept local oscillator signal, where $\psi$ is defined when the input signal and the swept local oscillator signal are at the same optical frequency. By utilizing the quadratic phase behavior of the heterodyne beat signal in signal processing, the resolution of a heterodyne-based OSA can be substantially improved over known heterodyne-based OSAs. Specifically, using orthogonal matched filters allows for the spectral characterization of highly coherent, narrow-linewidth lasers whose spectral features are narrower than the bandwidth of the heterodyne receiver.

Figure 1:
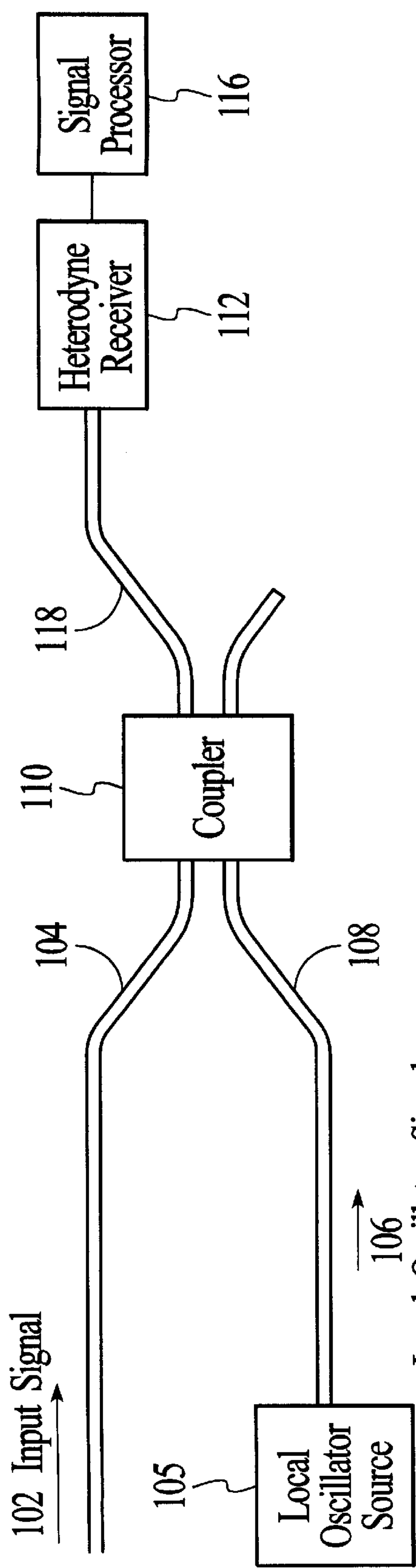
FIG. 1 is a depiction of heterodyne-based OSA that utilizes known signal processing to identify the heterodyne beat signal.
Figure 3:
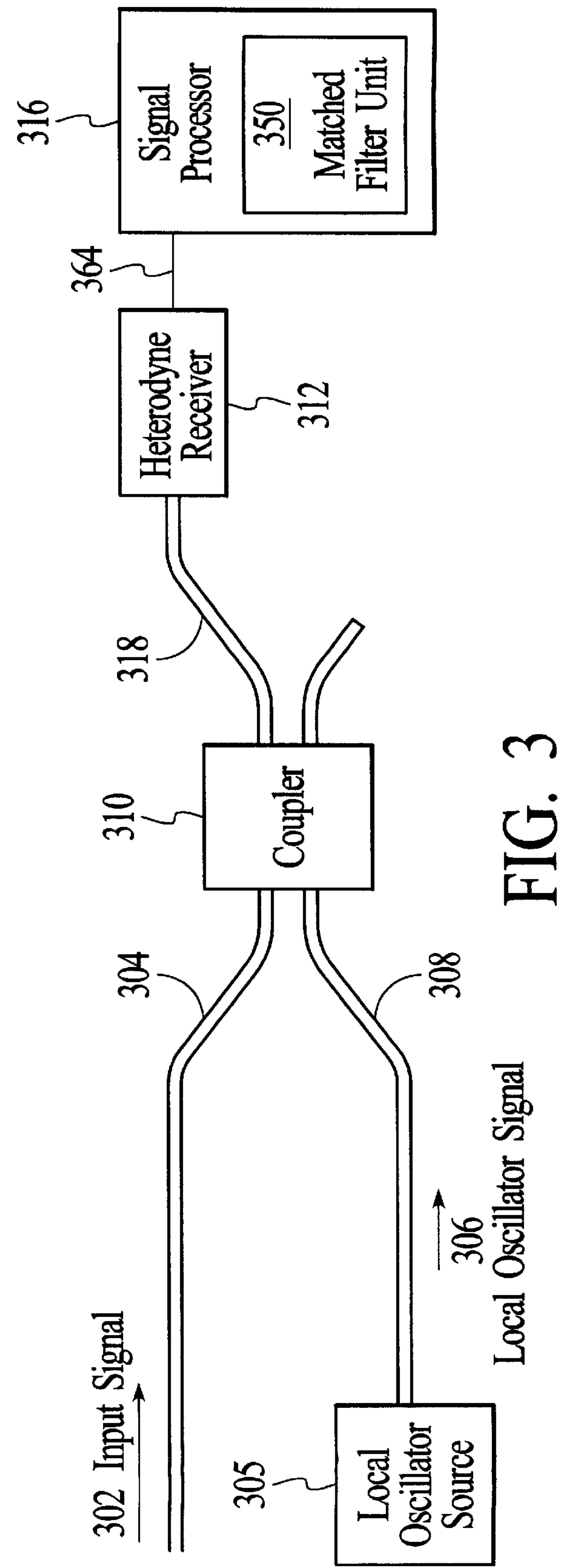
FIG. 3 is a depiction of a heterodyne-based OSA with a signal processor that includes a matched filter unit in accordance with an embodiment of the invention.
Figure 2:
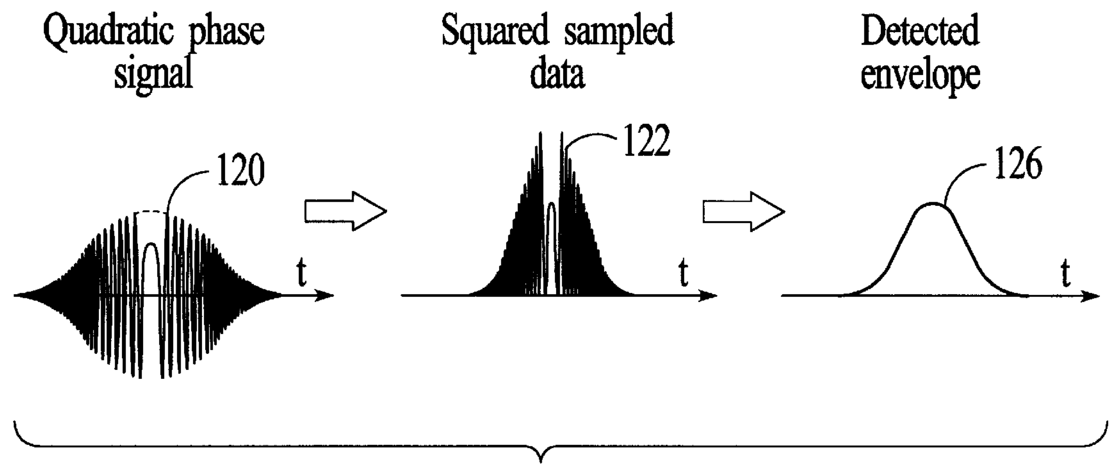
FIG. 2 depicts envelope detection of a quadratic phase signal, such as a heterodyne beat signal, in accordance with the prior art.

FIG. 3 depicts an embodiment of a heterodyne-based optical spectrum analyzer that utilizes matched filtering. The optical spectrum analyzer includes a signal fiber 304, a local oscillator source 305, a local oscillator fiber 308, an optical coupler 310, a heterodyne receiver 312, a signal processor 316, and a matched filter unit 350 that is part of the signal processor. It should be noted that throughout the description, similar reference numerals are utilized to identify similar elements.

The signal fiber 304 carries an input signal that is to be detected by the system. In an embodiment, the signal fiber is a single mode optical fiber as is known in the field. Throughout the description, the optical signals that are carried in optical fibers may alternatively be carried in other waveguides or in free space.

The input signal 302 includes highly coherent optical signals that are generated from conventional devices as is known in the field of optical communications systems. For example, the input signal may be generated from a single laser or multiple lasers and may consist of a single wavelength or multiple wavelengths as is known in the field of wavelength division multiplexing. In addition to the wavelength characteristic, the input signal also has a phase state that can be defined at any point in time. Although the phase state of the input signal can be defined at any point in time, the phase state of the input signal may be changing during signal transmission.

In an embodiment, the input signal 302 has unknown optical characteristics that are measured by the optical spectrum analyzer. The input signal may alternatively be an optical signal that is input with known optical characteristics, in which case the optical spectrum analyzer can be utilized for optical network analysis. When the optical spectrum analyzer is utilized for optical network or component analysis, the characteristics of a network or a single component can be determined by inputting a known input signal into the network or the single component and then measuring the response to the known signal.

The local oscillator source 305 generates a local oscillator signal. In an embodiment, the local oscillator source is a highly coherent tunable laser that is tunable over a wavelength range of one nanometer or greater. As described herein, a highly coherent tunable laser is a tunable laser that has a coherence time that is longer than the time that is required for the laser to sweep the receiver bandwidth. A faster sweep rate causes a shorter sweep time through the receiver bandwidth and relaxes the coherency requirements of the local oscillator source. During optical spectrum analysis, the local oscillator source generates a highly coherent local oscillator signal that is swept across a range of frequencies, or wavelengths, in order to detect the input signal over the range of frequencies or wavelengths. In an embodiment, the sweep rate of the local oscillator signal at 1,550 nanometers is approximately 40 nm/s or 6.15 MHz/$\mu$s, however the sweep rate can be higher or lower. Although the phase state of the local oscillator signal can be defined at any point in time, the phase state of the local oscillator signal may be changing during signal transmission.

The local oscillator fiber 308 is an optical fiber, such as a single mode optical fiber, that carries the local oscillator signal 306 to the optical coupler 310.

The optical coupler 310 combines the input signal 302 and the swept local oscillator signal 306 onto a common waveguide. As shown in FIG. 3, the optical coupler combines the input signal and the swept local oscillator signal and distributes the combined optical signal into an output fiber 318. Although only one output fiber is shown in FIG. 3, more than one output fiber can be utilized to transmit a portion of the combined optical signal to the heterodyne receiver 312 for balanced detection.

The optical coupler 310 may be an optically directional 3 dB fiber coupler, although other optical couplers may be utilized. In an embodiment, the optical coupler is substantially independent of the wavelength and polarization of the input signal 302 and the swept local oscillator signal 306. In an embodiment, the optical coupler is a single mode coupler.

The output fiber 318 is a single mode optical fiber that carries the combined optical signal from the optical coupler 310 to the heterodyne receiver 312. Multiple output fibers may be utilized to support, for example, a balanced receiver.

The heterodyne receiver 312 is connected to receive the combined optical signal from the optical coupler 310. In an embodiment, the heterodyne receiver utilizes square law detection, which results in mixing of the input signal and the swept local oscillator signal. Mixing of the two optical signals produces a heterodyne beat signal at a frequency that is equal to the frequency difference between the input signal and the swept local oscillator signal. For highly coherent input and local oscillator signals, as described herein, the resulting heterodyne beat signal has a quadratic phase behavior resulting from the linearly changing frequency of the heterodyne beat signal. The heterodyne beat signal generated by the heterodyne receiver is provided to the signal processor 316 via an electrical connection 364. Although not shown, the optical receiver may include photodetectors, signal amplifiers, and filters, as is known in the field. In an embodiment, the heterodyne receiver has a bandwidth of approximately 10 MHz. As an alternative to a photodetector based optical receiver, the heterodyne receiver may utilize other detection devices, such as a non-linear mixing element. Other configurations of the heterodyne receiver may be implemented, such as, for example, a balanced receiver.

The signal processor 316 includes a multifunction processor that receives the electrical signals from the heterodyne receiver 312 and isolates the heterodyne beat signal to generate an output signal that is indicative of an optical parameter, such as optical frequency, wavelength, or amplitude, of the input signal 302. The signal processor may include analog signal processing circuitry, digital signal processing circuitry, or software or any combination thereof, as is known in the field of electrical signal processing. In an embodiment, an analog signal from the receiver is converted into a digital signal and the digital signal is subsequently processed to generate an output signal. The matched filter unit 350 within the signal processor is described below with reference to FIGS. 4 and 5.

Figure 4:
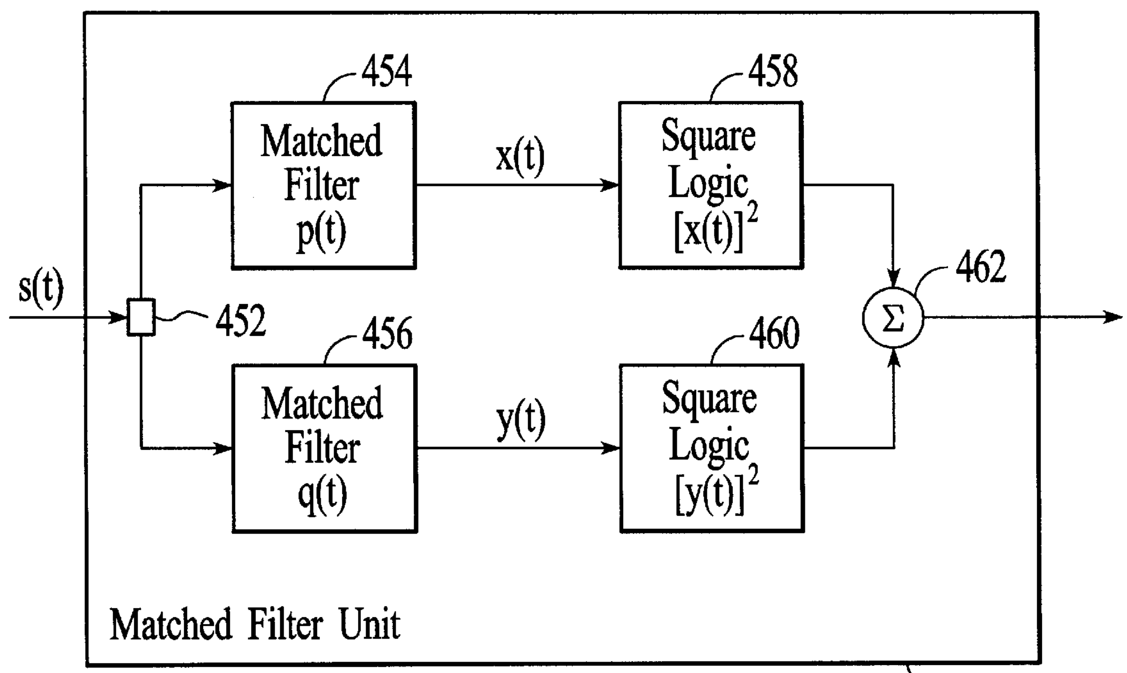
FIG. 4 depicts an embodiment of the matched filter unit shown in FIG. 3, which includes a signal splitter, two matched filters, square logic, and summing logic in accordance with an embodiment of the invention.

The matched filter unit 350 includes at least one matched filter for filtering the heterodyne beat signal. In an embodiment, the matched filter unit includes two matched filters for filtering two different portions of the heterodyne beat signal. In other embodiments, the matched filter unit includes more than two matched filters. FIG. 4 depicts an embodiment of the matched filter unit 350 that includes a signal splitter 452, two matched filters 454 and 456, squaring units 458 and 460, and a summing unit 462. In an embodiment, the splitter divides an incoming heterodyne beat signal into two approximately equal heterodyne beat signals. The outputs from the splitter are forwarded to the matched filters. The matched filters are realized in filtering circuitry, software or firmware, which is well known in the field of signal processing, to filter the heterodyne beat signal. In the matched filter unit of FIG. 4, the filtering function of the upper matched filter is expressed as p(t) and the filtering function of the lower matched filter is expressed as q(t). A matched filter, by definition, matches the signal being detected and its representation in the time domain is a mirror image of the input signal. In the case of an input signal that is symmetrical, such as a heterodyne beat signal, the matched filter is identical to the input signal. The impulse response of the matched filter is also identical to the input signal. For description purposes, the output of the upper matched filter is expressed as x(t) and the output of the lower matched filter is expressed as y(t). The outputs from the matched filters are forwarded to the squaring units. The squaring units include known circuitry for squaring the outputs from the matched filters. The outputs from the squaring units are forwarded to the summing unit. The summing unit includes known circuitry for summing the outputs from the squaring unit. The output from the summing unit is a signal that is indicative of the wavelength and amplitude of the input signal.

In an embodiment, the two matched filters 454 and 456 are orthogonal. That is, the two matched filters correspond to two phases that are different by $\pi/2$, for example, $\psi_p=0$ and $\psi_q=\pi/2$. As is described in more detail below, the orthogonal relationship between the two matched filters provides an output signal that is independent of the phase difference, $\psi$, between the input signal and the swept local oscillator signal. Providing an output signal that is independent of the phase difference is accomplished by squaring and adding the outputs x(t) and y(t). When more than two matched filters are used, the phase and processing scheme are modified to account for the multiple outputs.

Operation of the heterodyne-based OSA with matched filter detection is described with reference to FIGS. 3–5. In operation, an input signal 302 propagates through the input fiber 304 of the OSA towards the optical coupler 310. Simultaneously, the local oscillator source 305 generates a swept local oscillator signal 306 that is transmitted through the local oscillator fiber 308 to the optical coupler. The input signal 302 and the swept local oscillator signal 306 are combined by the optical coupler into a combined optical signal. The combined optical signal is output onto output fiber 318 and transmitted to the heterodyne receiver 312. The combined optical signal is detected and mixed by the heterodyne receiver and a heterodyne beat signal is generated in response to the combined optical signal. The heterodyne beat signal is filtered in the matched filter unit 350 of the signal processor 316 and the filtered heterodyne beat signal is monitored utilizing known techniques to determine an optical parameter of the input signal, such as wavelength, frequency, or amplitude.

Figure 5:
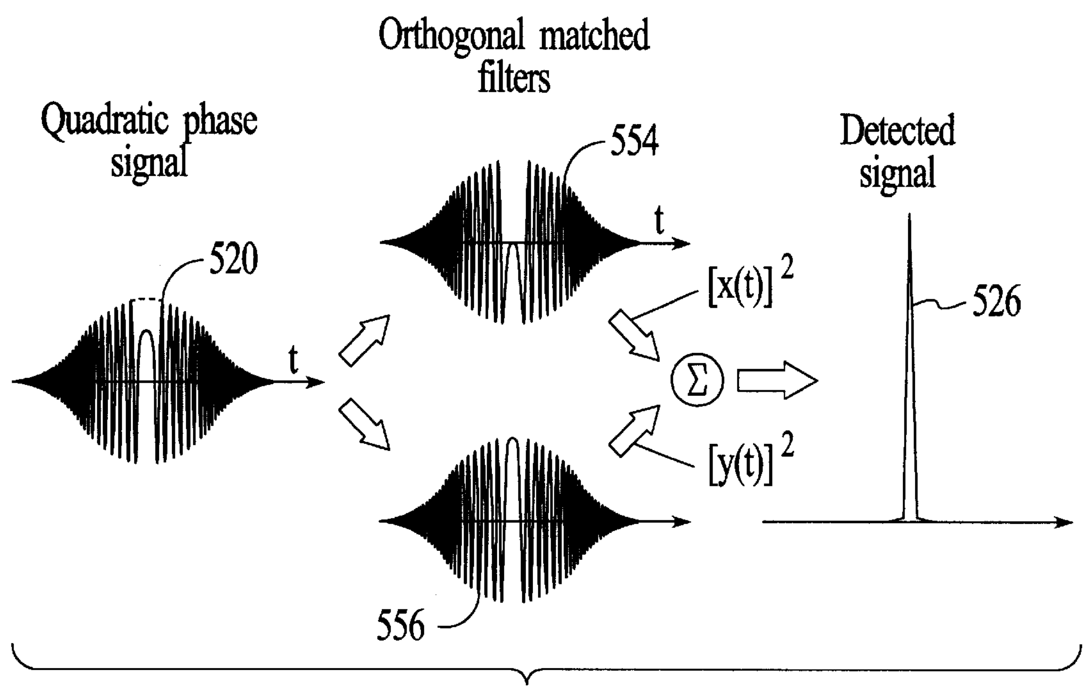
FIG. 5 graphically depicts the process of matched filtering in a heterodyne-based OSA that is performed by the matched filter unit described with reference to FIGS. 3 and 4.

FIG. 5 graphically depicts the process of matched filtering that is performed by the matched filter unit 350 described with reference to FIG. 4. At the left of FIG. 5, the functional form of the quadratic phase heterodyne beat signal 520 is depicted in the time domain. In the center of FIG. 5, the functional form 554 and 556 of the two orthogonal matched filters 454 and 456 is depicted in the time domain. The filter functions of the matched filters shown in FIG. 5 match the heterodyne beat signal for $\psi_p=0$ and $\psi_q=\pi/2$. The heterodyne beat signal is divided into two signals that are applied separately to the two orthogonal matched filters. The outputs x(t) and y(t) of the two filters are squared and then summed. The summed output is utilized to generate a representation of the detected input signal. A representation of the detected input signal 526 is depicted in the time domain at the right of FIG. 5. In another embodiment, the filtering can be performed in the frequency domain. Filtering of the heterodyne beat signal in the frequency domain is described in more detail below.

Because the matched filters described with reference to FIGS. 4 and 5 are orthogonal, the output of the matched filter unit is independent of the phase difference, ψ, between the input signal and the local oscillator signal. Because perfectly orthogonal matched filters are impractical to achieve, the matched filters are considered herein to be orthogonal if they are within ±10 percent of complete orthogonality. The orthogonality of the matched filters is described in more detail below. The matched filter detection technique is applicable in measurements of narrow line-width lasers whose coherence time is longer than the sweep time over the bandwidth of the receiver. The relationship of coherence time to sweep time ensures the quadratic phase behavior of the heterodyne beat signal.

Although the optical components of the optical heterodyne detection system are described as being connected by optical fibers, the individual devices may be integrated onto a monolithic device, such as a planar waveguide circuit. Alternatively, the optical elements may be connected by free space.

Figure 6:
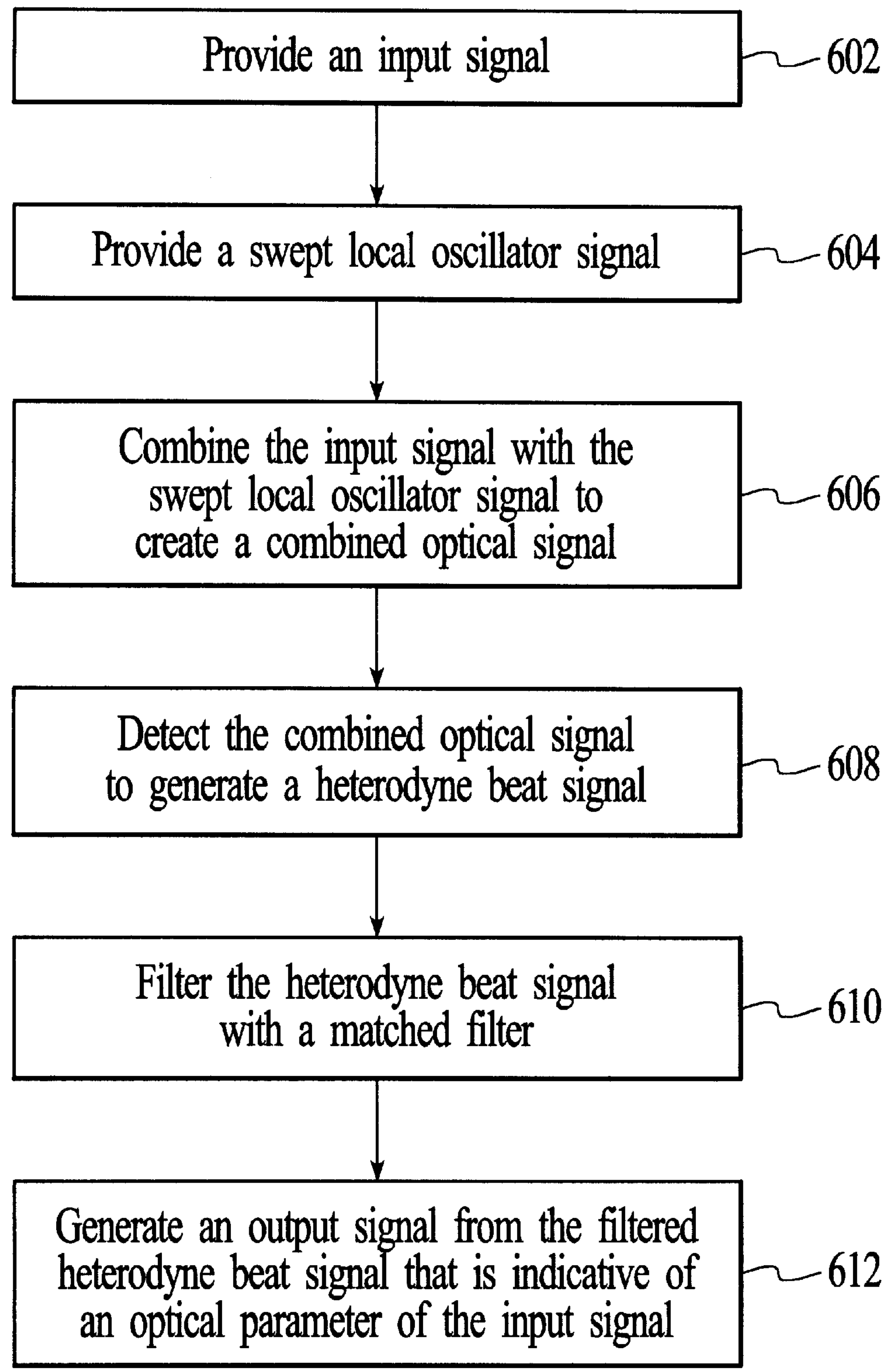
FIG. 6 is a process flow diagram of a method for optical spectrum analysis that utilizes matched filtering to identify the heterodyne beat signal in accordance with an embodiment of the invention.

A process flow diagram of a method for optical spectrum analysis that utilizes optical heterodyne detection is depicted in FIG. 6. At step 602, an input signal is provided. At step 604, a swept local oscillator signal is provided. At step 606, the input signal is combined with the swept local oscillator signal to create a combined optical signal. At step 608, the combined optical signal is detected to generate a heterodyne beat signal. At step 610, the heterodyne beat signal is filtered with a matched filter. At step 612, an output signal, which is indicative of an optical parameter of the input signal, is generated from the filtered heterodyne beat signal.

A theoretical description of matched filtering in a heterodyne-based OSA is provided below. Consider an optical heterodyne-based OSA that involves mixing a tunable laser with a laser source that is being tested. It is assumed that the tunable laser and the laser source that is being tested have narrow line-widths and can be accurately modeled by Dirac delta functions. The tunable laser (referred to as the local oscillator (LO)) and the laser to be tested (referred to as the device under test DUT)) are mathematically expressed as:

LO

Frequency: $\nu_o=\nu_1+\gamma t$

Phase: $\phi_o=\pi\gamma t^2+2\pi\nu_1 t+\psi_1$

Electric field: $e_o=a_o e^{j\phi_o}$

DUT

Frequency: $\nu_s=\nu_2$

Phase: $\phi_s=2\pi\nu_2 t+\psi_2$

Electric field: $e_s=a_s e^{j\phi_s}$ where:

$\gamma$=the rate of change of the optical frequency $\nu_1$=the initial optical frequency of the LO $\nu_o$=the optical frequency of the LO $\nu_s$=the optical frequency of the DUT $\psi_1$, $\psi_2$=constants $a_o$, $a_s$=the amplitude of the electrical field For simplicity of description, it is assumed that $a_o=a_s=1/\sqrt{2}$.

Given the above expressions and assumptions, the detected intensity in a bandwidth unlimited system is expressed as:

$$I=1+\cos(\pi\gamma t^2+2\pi\nu_1 t-2\pi\nu_2 t+\psi_1-\psi_2)$$

Figure 7:
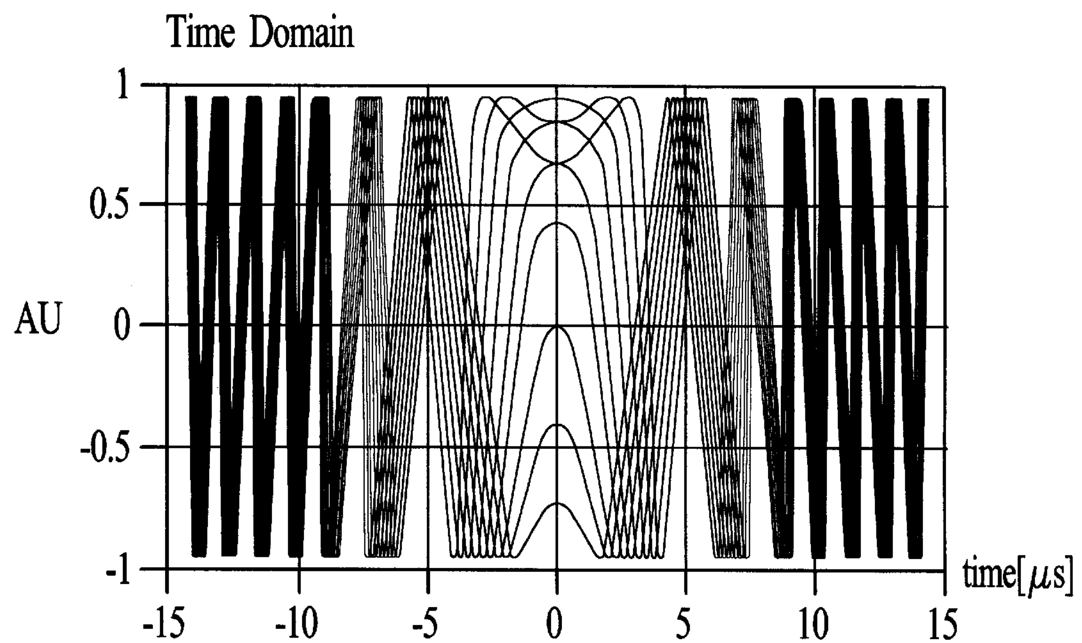
FIG. 7 represents the family of curves, in the time domain, for different phases, $\psi$, of an exemplary heterodyne beat signal that is detected in a bandwidth unlimited system.
Figure 8:
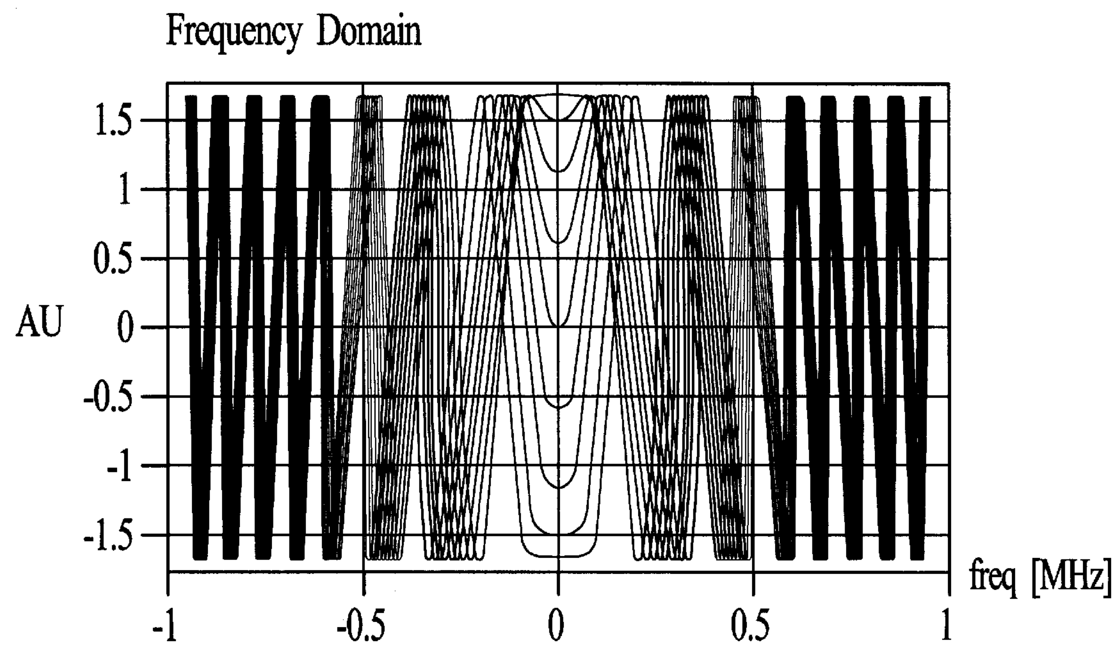
FIG. 8 represents the family of curves, in the frequency domain, for different phases, $\psi$, of an exemplary heterodyne beat signal that is detected in a bandwidth unlimited system.

Again for simplicity of description, it is assumed that $\nu_1=\nu_2$ and that $\psi_1-\psi_2=\psi$, where ψ is describes the phase relationship between the LO and the DUT when their optical frequencies are identical. Given the above assumptions, the detected intensity of the combined LO and DUT signals is expressed as:

$$I=1+\cos(\pi\gamma t^2+\psi)$$

where cos ($\pi\gamma t^2+\psi$) represents the heterodyne beat signal. The heterodyne beat signal has a characteristic quadratic phase behavior, with the exact look of the signal depending on the phase difference constant, ψ. One property of the heterodyne signal is that quadratic phase behavior exists in the time and frequency domains because the functional form of the heterodyne beat signal is invariant to the Fourier transform. FIGS. 7 and 8 represent the family of curves, in the time and frequency domains, for different phases, ψ, of an exemplary heterodyne beat signal, that are detected in a bandwidth unlimited system. FIG. 7 represents the time domain and FIG. 8 represents the frequency domain of the heterodyne beat signal. The conversion between the time and frequency domains is described by the following Fourier transform:

$$\mathcal{F}\{\cos(at^2+\varphi)\} = \sqrt{\frac{1}{2a}}\cos\left(\frac{\omega^2}{4a}-\varphi-\frac{\pi}{4}\right)$$

It should be noted that the function cos ($\pi\gamma t^2+\psi$) is related to the Gaussian function $e^{-at^2}$. Therefore, its Fourier transform as well as the Fourier transforms of its combinations with the Gaussian function exist in analytical form.

Figure 9:
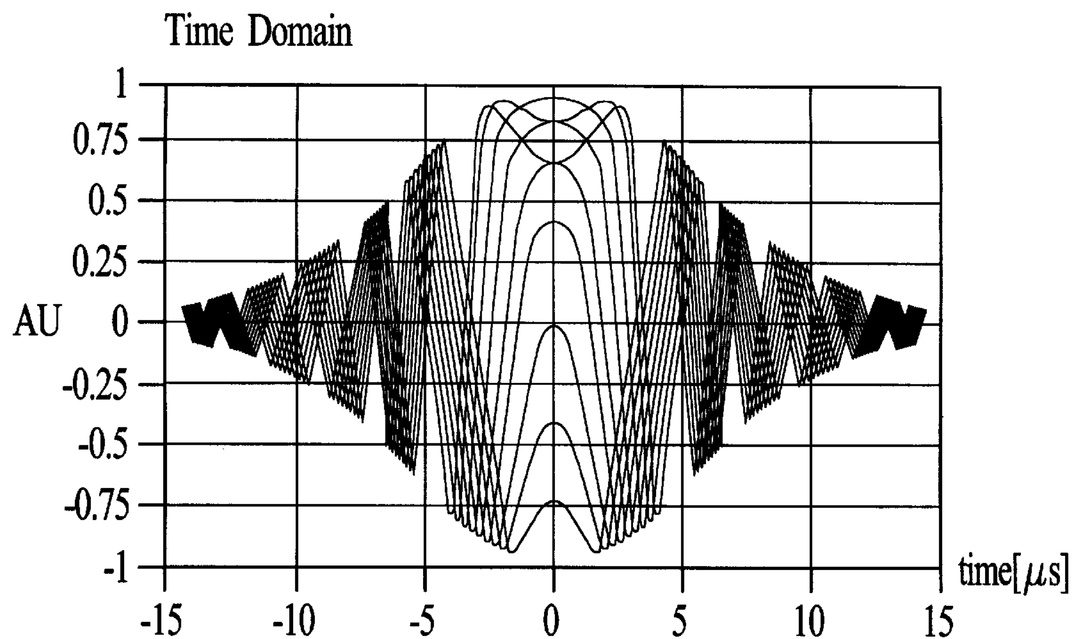
FIG. 9 represents the family of curves, in the time domain, for different phases, $\psi$, of an exemplary heterodyne beat signal that is detected in a bandwidth limited system.
Figure 10:
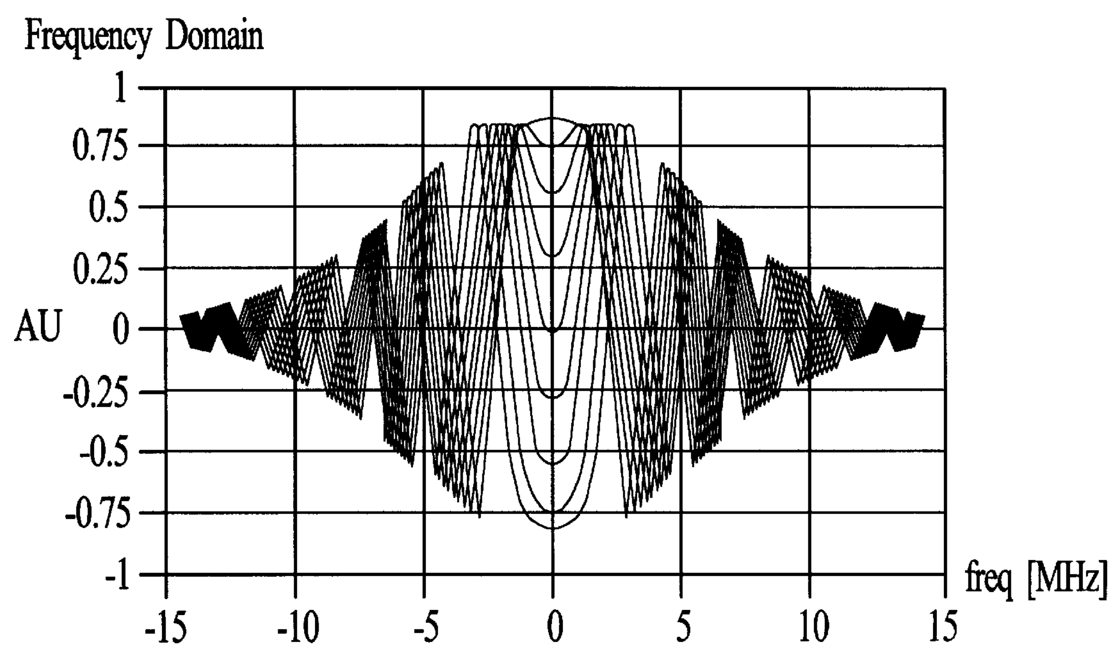
FIG. 10 represents the family of curves, in the frequency domain, for different phases, $\psi$, of an exemplary heterodyne beat signal that is detected in a bandwidth limited system.

In a practical heterodyne-based OSA, the bandwidth of the heterodyne receiver is limited and therefore only the selected frequency range is detected. For simplicity of description, it is assumed that the heterodyne receiver has the Gaussian low-pass response. Because of the symmetry between the time and frequency domains, the Gaussian envelope also appears in the time domain. FIGS. 9 and 10 represent the family of curves in the time and frequency domains for different phases, ψ, of an exemplary heterodyne beat signal that are generated in a bandwidth limited system. FIG. 9 represents the time domain and FIG. 10 represents the frequency domain.

Because of the symmetry of the heterodyne beat signal, the matched filter, as represented in the time domain, is identical to the heterodyne beat signal and so is its impulse response. That is, the impulse response produces the time representation of the transfer function. Since the heterodyne beat signal can change with the phase term, ψ, two orthogonal matched filters are utilized for filtering. In an embodiment, the phase difference of the two matched filters is π/2, which ensures the orthogonality of the two matched filters. For example, when the phase terms for the two matched filters are ψ=0 and ψ=π/2, the filtering functions p(t) and q(t) of the two orthogonal matched filters can be defined in the time domain as:

$$p(t)=e^{-bt^2}\cos(at^2)$$

$$q(t)=e^{-bt^2}\cos(at^2+\pi/2)$$

Although orthogonal matched filters can be established by setting the phase difference to π/2, by definition, the filtering functions p(t) and q(t) are orthogonal when:

$$\int_{-\infty}^{\infty} p(t)\cdot q(t)dt=0$$

Utilizing matched filters with an orthogonal phase relationship assures the detection of the heterodyne beat signal with an arbitrary phase term, ψ, such that the sum of squares of the filter outputs is constant and independent of ψ.

In general the receiver can be characterized by a transfer function H(ω) or $h(t)=\mathcal{F}^{-1}\{H(\omega)\}$. Then, the filtering functions of the matched filters are:

$$p(t)=h(t)^*\cos(at^2);$$

and $$q(t)=h(t)^*\cos(at^2+\pi/2)$$

where * denotes the convolution. In this case, the filters are not completely orthogonal, and:

$$\int_{-\infty}^{\infty} p(t)\cdot q(t)dt\approx 0$$

Filters are defined herein as orthogonal when:

$$\frac{\left|\int_{-\infty}^{\infty} p(t)\cdot q(t)dt\right|}{\int_{-\infty}^{\infty} p^2(t)dt}<10\%$$

Since completely orthogonal filters are difficult to achieve in actual systems, the matched filters should be orthogonal within a margin of approximately ±10 percent. In a system with nearly orthogonal matched filters, the sum of squares of the filter outputs is nearly constant (i.e., $x(t)^2+y(t)^2\approx$constant) and therefore substantially independent of the phase difference, ψ.

The outputs x(t) and y(t) provide information about the phase difference, ψ, or more precisely, about the relative phase with respect to the chosen matched filters p(t) and q(t). If y(t)≅0, then the detected signal is nearly orthogonal to q(t) and identical to p(t). Similarly, if x(t)≅0, then the detected signal is nearly orthogonal to p(t ) and identical to q(t). The relative phase can be expressed as:

$$\Theta=\arctan y(t)/x(t)$$

The orthogonality of filtering functions, p(t) and q(t), can be controlled by adjusting the receiver transfer function.

Figure 11:
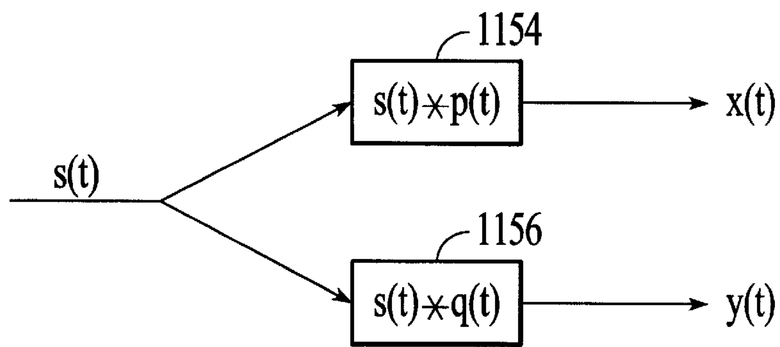
FIG. 11 depicts the filtering of a heterodyne beat signal with two matched filters in the time domain.

Matched filtering in a heterodyne-based OSA can be implemented in the time domain or in the frequency domain. FIG. 11 depicts filtering in the time domain given the heterodyne beat signal, s(t), and the two matched filter functions, p(t) and q(t). The outputs of the two matched filter functions 1154 and 1156 are:

$$x(t)=s(t)^*p(t);$$

and $$y(t)=s(t)^*q(t)$$

where * is the convolution.

Figure 12:
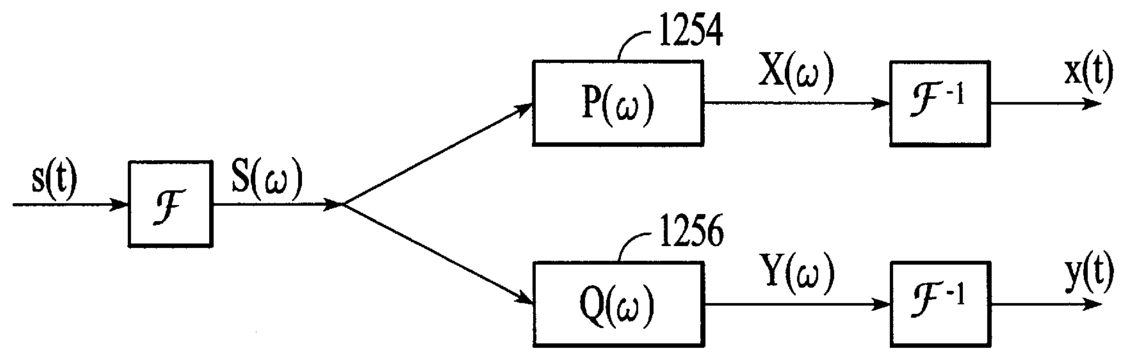
FIG. 12 depicts the filtering of a heterodyne beat signal with two matched filters in the frequency domain.

FIG. 12 depicts filtering in the frequency domain. Filtering the heterodyne beat signal in the frequency domain involves transforming the heterodyne beat signal, s(t), to the frequency domain, S(ω), using a Fourier transform, $\mathcal{F}^{-1}$ (carried out by transform unit 1270) and then multiplying the transformed heterodyne beat signal by the matched filter transform functions that are defined in the frequency domain, where $P(\omega)=\mathcal{F}^{-1}\{p(t)\}$ to and $Q(\omega)=\mathcal{F}^{-1}\{q(t)\}$. The outputs of the two filter functions 1254 and 1256 are:

$$X(\omega)=S(\omega)\cdot P(\omega);$$

and $$y(\omega)=S(\omega)\cdot Q(\omega)$$

The resulting outputs are then inversely transformed from the frequency domain back to the time domain by transform units 1272 and 1274, such that:

$$x(t)=\mathcal{F}^{-1}\{X(\omega)\};$$

and $$y(t)=\mathcal{F}^{-1}\{Y(\omega)\}$$

Use of the matched filters improves both the resolution and the dynamic range of the heterodyne spectrum analyzer. The improvement in the dynamic range (signal to noise) is due to inherent properties of the matched filters. The improvement in resolution is a consequence of convolving the heterodyne beat signal with the matched filters. Since both functions have multiple, non-uniformly spaced, peaks, their convolution results in a function with a sharp central peak whose width is substantially narrower than the receiver bandwidth.

What is claimed is:

1. A method for optical spectrum analysis that utilizes optical heterodyne detection comprising steps of:

providing an input signal;

providing a swept local oscillator signal;

combining said input signal with said swept local oscillator signal to create a combined optical signal;

detecting said combined optical signal to generate a heterodyne beat signal;

filtering said heterodyne beat signal with a matched filter; and generating, from said filtered heterodyne beat signal, an output signal that is indicative of an optical parameter of said input signal.

2. The method of claim 1 wherein said step of filtering includes steps of:

splitting said heterodyne beat signal into a first heterodyne beat signal and a second heterodyne beat signal;

filtering said first heterodyne beat signal with a first matched filter to produce a filtered first heterodyne beat signal;

filtering said second heterodyne beat signal with a second matched filter to produce a filtered second heterodyne beat signal;

generating, from said filtered first and second heterodyne beat signals, said output signal.

3. The method of claim 2 wherein said first and second matched filters are orthogonal.

4. The method of claim 2 wherein said filtering is performed in the time domain.

5. The method of claim 4 wherein said filtering in the time domain includes convolving said heterodyne beat signal with said first and second matched filters, wherein said first and second matched filters are defined in the time domain.

6. The method of claim 2 wherein said filtering is performed in the frequency domain.

7. The method of claim 6 wherein said filtering in the frequency domain includes:

transforming said first and second heterodyne beat signals to the frequency domain;

multiplying said first transformed heterodyne beat signal by said first matched filter to produce said filtered first transformed heterodyne beat signal;

multiplying said second transformed heterodyne beat signal by said second matched filter to produce said filtered second transformed heterodyne beat signal; and transforming said filtered first and second transformed heterodyne beat signals to the time domain.

8. The method of claim 2 further including steps of:

squaring said filtered first heterodyne beat signal;

squaring said filtered second heterodyne beat signal; and using said squared first and second filtered heterodyne beat signal to generate said output signal.

9. The method of claim 8 further including a step of summing said squared first heterodyne beat signal and said squared second heterodyne beat signal.

10. The method of claim 9 wherein said first and second matched filters are orthogonal.

11. A method for optical spectrum analysis that utilizes optical heterodyne detection comprising steps of:

providing an input signal;

providing a swept local oscillator signal;

combining said input signal with said swept local oscillator signal to create a combined optical signal;

detecting said combined optical signal to generate a heterodyne beat signal;

splitting said heterodyne beat signal into multiple heterodyne beat signals;

filtering said multiple heterodyne beat signals with matched filters; and generating, from said filtered heterodyne beat signals, an output signal that is indicative of an optical parameter of said input signal.

12. The method of claim 11 wherein:

said step of splitting includes splitting said heterodyne beat signal into a first heterodyne beat signal and a second heterodyne beat signal;

said step of filtering includes filtering said first heterodyne beat signal with a first matched filter and filtering said second heterodyne beat signal with a second matched filter; and said step of generating includes generating, from said filtered first and second heterodyne beat signals, said output signal.

13. The method of claim 12 wherein said first and second matched filters are orthogonal.

14. The method of claim 12 wherein said filtering is performed in the time domain.

15. The method of claim 14 wherein said filtering in the time domain includes convolving said heterodyne beat signal with said first and second matched filters, wherein said first and second matched filters are defined in the time domain.

16. The method of claim 12 wherein said filtering is performed in the frequency domain.

17. The method of claim 16 wherein said filtering in the frequency domain includes:

transforming said first and second heterodyne beat signals to the frequency domain;

multiplying said first transformed heterodyne beat signal by said first matched filter to produce said filtered first transformed heterodyne beat signal;

multiplying said second transformed heterodyne beat signal by said second matched filter to produce said filtered second transformed heterodyne beat signal; and transforming said filtered first and second transformed heterodyne beat signals to the time domain.

18. The method of claim 12 further including steps of:

squaring said filtered first heterodyne beat signal;

squaring said filtered second heterodyne beat signal; and using said squared first and second filtered heterodyne beat signals to generate said output signal.

19. The method of claim 18 further including a step of summing said squared first heterodyne beat signal and said squared second heterodyne beat signal.

20. The method of claim 19 wherein said first and second matched filters are orthogonal.

21. A system for optical spectrum analysis comprising:

an optical coupler having a first input and a second input, said first input being optically connected to receive an input signal, said second input being optically connected to receive a swept local oscillator signal, said optical coupler having an output for outputting a combined optical signal that includes said input signal and said swept local oscillator signal;

a heterodyne receiver having an input for receiving said combined optical signal from said optical coupler and an output for outputting a heterodyne beat signal that is representative of said combined optical signal; and a signal processor for receiving said heterodyne beat signal from said optical receiver and for generating an output signal that is indicative of an optical parameter of said input signal;

said signal processor including a matched filter unit for filtering said heterodyne beat signal before said output signal is generated.

22. The system of claim 21 wherein said matched filter unit includes:

a splitter for splitting said heterodyne beat signal into multiple heterodyne beat signals;

multiple matched filters configured to filter said multiple heterodyne beat signals and to output multiple filtered heterodyne beat signals; and wherein said signal processor generates said output signal from said multiple filtered heterodyne beat signals.

23. The system of claim 21 wherein said matched filter unit includes:

a splitter for splitting said heterodyne beat signal into a first heterodyne beat signal and a second heterodyne beat signal;

a first matched filter configured to filter said first heterodyne beat signal and to output a filtered first heterodyne beat signal;

a second matched filter configured to filter said second heterodyne beat signal and to output a filtered second heterodyne beat signal.

24. The system of claim 23 wherein said first and second matched filters are orthogonal.

25. The system of claim 23 wherein said first and second matched filters are configured to filter in the time domain.

26. The system of claim 25 wherein said first heterodyne beat signal is convolved with said first matched filter and wherein said second heterodyne beat signal is convolved with said second matched filter.

27. The system of claim 23 wherein said first and second matched filters are configured to filter in the frequency domain.

28. The system of claim 27 further including:

a domain transform unit for transforming said first and second heterodyne beat signals to the frequency domain;

a process unit for multiplying said first transformed heterodyne beat signal by said first matched filter to produce said filtered first transformed heterodyne beat signal and for multiplying said second transformed heterodyne beat signal by said second matched filter to produce said filtered second transformed heterodyne beat signal; and a domain transform unit for transforming said filtered first and second transformed heterodyne beat signals to the time domain.

29. The system of claim 23 further including a squaring unit for squaring said filtered first heterodyne beat signal from said first matched filter and for squaring said filtered second heterodyne beat signal from said second matched filter.

30. The system of claim 29 further including a summing unit for summing the outputs from said square logic.

31. The system of claim 31 wherein said first and second matched filters are orthogonal.

32. The system of claim 22 further including a tunable laser optically connected to said optical coupler for generating said swept local oscillator signal.

* * * * *